United States Patent [19]

Matsubara et al.

[11] Patent Number: 4,927,707
[45] Date of Patent: May 22, 1990

[54] COMBINATION OF SLIDE MEMBERS

[75] Inventors: Toshihiko Matsubara; Taku Kitayama, both of Utsunomiya, Japan

[73] Assignee: Honda Giken Kogyo Kabashiki Kaisha, Tokyo, Japan

[21] Appl. No.: 241,424

[22] Filed: Sep. 7, 1988

[30] Foreign Application Priority Data

Sep. 8, 1987 [JP] Japan .................................. 224598

[51] Int. Cl.$^5$ .......................... B32B 5/16; C22C 29/02
[52] U.S. Cl. ..................................... 428/323; 428/143; 428/408; 428/457; 419/14; 75/230; 75/236
[58] Field of Search ............... 428/143, 323, 457, 906, 428/408; 75/230, 236, 243; 419/14

[56] References Cited

U.S. PATENT DOCUMENTS

| | | |
|---|---|---|
| 2,266,379 | 1/1939 | Floyd . |
| 3,909,252 | 9/1975 | Kuriyama et al. .................... 75/128 |
| 4,165,407 | 8/1979 | Endoh et al. ........................ 428/408 |
| 4,302,248 | 11/1981 | Kasamatsu et al. .................. 420/73 |
| 4,388,114 | 7/1983 | Suganuma et al. ................... 75/243 |

FOREIGN PATENT DOCUMENTS 1810971 7/1967 United Kingdom .

Primary Examiner—George F. Lesmes
Assistant Examiner—Christopher Brown
Attorney, Agent, or Firm—Armstrong, Nikaido, Marmelstein, Kubovcik & Murray

[57] ABSTRACT

A combination of a first slide member made of ferrous material in which at least a slide surface layer thereof has a metallurgical structure having granular carbides dispersed in a matrix phase, and a second slide member made of ferrous material in which at least a slide surface layer thereof has a metallurgical structure having network-like carbides dispersed in a martensite matrix phase. A proportion of an area occupied by the granular carbides on the slide surface of the first slide member is larger than a proportion of an area occupied by the network-like carbides on the slide surface of the second slide member, and owing to this difference in these occupied area proportions, generation of coagulative wear (scuffing) between the respective slide members can be effectively prevented, and a good anti-wear property is obtainable from viewpoints of scuffing as well as pitting.

4 Claims, 2 Drawing Sheets

COMBINATION OF SLIDE MEMBERS

BACKGROUND OF THE INVENTION

The present invention relates to a combination of slide members made of ferrous material and having excellent wear resistance.

In the case where two members come into slide contact with each other, slip wear must be taken into consideration. Slip wear would take various modes depending upon combination of materials of the respective slide members, a surface state, a wearing condition and the like, and it is generally classified into coagulative wear, grinding wear and corrosive wear depending upon the mechanism of generation of the wear.

Coagulative wear is the mode of wear occurring in the case where metals having no significant difference in mechanical properties (including identical materials) come into frictional contact with each other. In the event that solid surfaces themselves come into frictional contact with each other, real contact would occur only at projected portions occupying very small parts of the surfaces and since the pressure at those portions would become very high and a deformation would occur at the real contact portions, surface contaminations such as adsorped layers of gas molecules, oxide films and oil films at those portions would be removed and coagulation would occur between the respective solid surfaces. As a result, the material having weaker mechanical strength would be taken away from the slide surface layer.

Grinding wear would arise in the case hardness of one of the contact surfaces is considerably higher than that of the other contact surface, then projecting portions of the surface having the higher hardness are pressed into the softer material due to the contact pressure, hence the softer material would be scraped out as a result of slide movement, and abrasive powder would be produced.

The scuffing phenomena (the phenomena in which coagulation between frictional surfaces themselves is remarkable and mainly the material having weaker mechanical strength is taken away from the surface layer of the member of that material) which become an issue in relation to slide contact, for instance, between a cam shaft and a rocker arm, between a cylinder and a piston ring or the like in an internal combustion engine, are really the phenomena caused by coagulative wear, and the present invention is directed mainly to the technical problem of suppressing the scuffing phenomena.

SUMMARY OF THE INVENTION

One object of the present invention is to suppress abnormal wear due to generation of scuffing between two slide members coming into slide contact with each other or the like and thereby improve wear resistance of the slide members.

The above-mentioned object can be achieved by combining a first slide member made of ferrous material in which at least a slide surface layer thereof has a metallurgical structure having granular carbides dispersed in a matrix phase, and a second member made of ferrous material in which at least a slide surface layer thereof has a metallurgical structure having network-like carbides dispersed in a martensite matrix phase.

Dispersing granular carbides forming hard particles in a matrix phase in the surface layer of a slide member is effective for preventing coagulative wear because the granular carbides come into contact with the opposed slide member and thereby coagulative wear can be suppressed. However, in the case where granular carbides are dispersed extremely finely in a matrix phase, so large effects cannot be expected because fine granular carbides would be taken away jointly with the matrix phase during the period when the slide member is held in slide contact with the opposed slide member. FIG. 1 shows the state where coarse carbide particles 2 are dispersed in a matrix phase 1 in the surface layer of a slide member made of ferrous material, and at this state the carbide particles 2 would come into contact with the opposed member, and thereby the matrix phase 1 can be protected.

To disperse hard network-like carbides 4 in a matrix phase 3 in the surface layer of a slide member made of ferrous material as shown in FIG. 2, is also effective for suppressing coagulative wear, and the more the surface layer contains the carbides, the more effectively occurrence and spread of the scuffing can be suppressed. While FIG. 2 shows a cross-section taken at right angles to a slide surface 5, the carbides 4 take a network-like configuration also in a cross-section taken along the slide surface 5. Since the network-like carbides 4 finely divide the matrix phase 3, even if scuffing phenomena should occur in one part of the matrix phase 3, spread of the scuffing phenomena would be prevented by the network-like carbides 4, and hence, as also assisted by the fact that mainly the network-like carbides 4 would come into contact with opposed slide member, excellent wear resistance of the slide member can be revealed.

Since spread or propagation of scuffing generated in a matrix phase are prevented by the carbides, anti-scuffing property (property for preventing spread of scuffing) of the slide member is governed by a distance between carbides. If an average inter-carbide distance is large, then the anti-scuffing property is small, whereas if an average intercarbide distance is small, then the anti-scuffing property is large. Assuming now that the occupation area proportions of carbides in two slide members, which have network-like carbides and granular carbides respectively, have been chosen to be equal to each other, then the average inter-carbide distance of a slide member having network-like carbides would become smaller than the average inter-carbide distance of another slide member having granular carbides. Accordingly, the slide member having a metallurgical structure in which network-like carbides are dispersed can exhibit larger anti-scuffing property even if it has a smaller occupation area proportion of carbides as compared with the slide member having a metallurgical structure in which granular carbides are dispersed.

On the other hand, in the carbide dispersing structure, unless the mechanical strength of the matrix phase is sufficiently large, the stresses occurring repeatedly during the slide contact with the opposed slide member would concentrate at the carbide structure, hence fatigue rupture of the carbides would be promoted (pitting phenomena). Accordingly, in the slide member to be subjected to repeated loading, to form the matrix phase in which the network-like carbides are dispersed, a martensite structure is effective for the purpose of enhancing fatigue strength. Also an excellent pitting suppressing effect can be obtained by dispersing the load acting upon the network-like carbides throughout the martensite matrix phase having a large fatigue strength to avoid the stress concentration at the network-like carbides. However, since degradation of a fatigue strength would be caused by decreasing of the matrix phase if an occupation area proportion of carbides on the slide surface becomes large, the occupation area proportion should be preferably limited to 50% or less.

As described above, by dispersing network-like carbides in a martensite matrix phase, effects against occurrence and spread of scuffing and pitting can be obtained. However, if slide members both having a metallurgical structure in which network-like carbides are dispersed were combined with each other, then chances in which the matrix phases of the both slide members contact with each other would become larger and scuffing would be liable to occur. Therefore, the invention proposes the combination of a metallurgical structure having network-like carbides dispersed in a martensite matrix phase and a metallurgical structure having granular carbides dispersed in a matrix phase as a desirable combination of slide members in order to suppress abnormal wear due to occurrence of scuffing and the like and improve anti-wear property.

It is to be noted that if an appropriate amount of MnS is dispersed along the network-like carbides, then upon cutting work the MnS dispersed along the network-like carbides would serve as a source of generation or propagation of cracks when cutting scraps are produced and thereby machinability can be improved, while degradation of a strength of the matrix phase is suppressed.

In the combination of the ferrous slide members having carbides dispersed in their matrix phases, it has been known that in order to prevent generation of scuffing, it is effective to select the occupation area proportions of carbides on the slide surfaces of the respective slide members so as to be different from each other. Owing to making the occupation area proportion of the network-like carbides smaller than that of the granular carbides, anti-wear property of the combination of slide members can be improved from a view point of scuffing as well as pitting.

The occupation area proportion of carbides may be measured, for example, by the following method. A cut cross-section surface of a specimen is ground and polished, then it is corroded, and the corroded surface is microscope-photographed. Then an occupation area proportion of carbides is calculated through a line segment method as shown in FIG. 3. A rectangular field having a predetermined area is selected on the microscope-photograph, then parallelscanning lines 6 are drawn at a predetermined interval length interval length ($d_0$). Lengths of line segments overlapping the respective carbide grains 7 are presented by $l_1, l_2, \ldots l_n$, and the length of the scanning line 6 is presented by L. Then, the occupation area proportion of carbides is calculated by the following formula:

$$(l_1 + l_2 + \ldots + l_n) \times d_0/L \times d_0 \times (m + 1) =$$

(toal area of carbides)/(area of the field) = occupation area proportion ( where m represents a number of scanning lines )

It is to be noted that this technique can be executed also by making use of a pattern analyzer.

Figure 1:
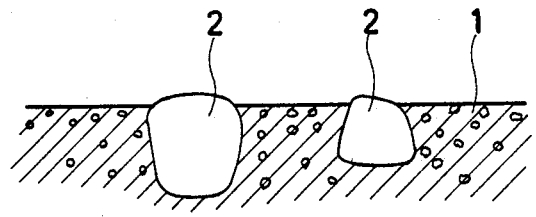
FIG. 1 is a cross-section view showing a slide surface layer of a first slide member made of ferrous material, wherein coarse granular carbides are dispersed in a matrix phase.
Figure 2:
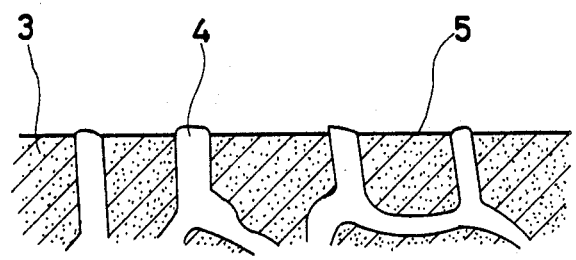
FIG. 2 is a cross-section view showing a slide surface layer of a second slide member made of ferrous material, wherein network-like carbides are dispersed in a matrix phase.
Figure 3:
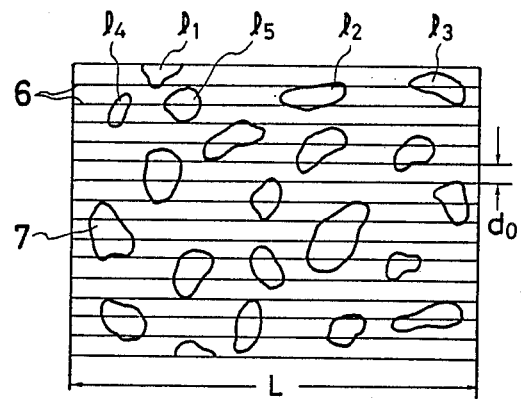
FIG. 3 is an illustration of a method for measuring an occupation area proportion of carbides.

DETAILED DESCRIPTION OF THE PREFERRED EMBODIMENTS:

A preferable material for use as the first slide member is, for example, 18Cr cast steel, and a preferable material for use as the second slide member is, for example, represented by the following composition. After a material having the following composition has been cast, a high-frequency quench hardening treatment is carried out for the surface layer to make it the second slide member:

| | |
|---|---|
| C ... 0.8–0.2%, | Si ... 0.4–2.0% |
| Mn ... 0.3–1.5%, | Cr ... 6.0–20.0% |
| Mo ... 0.3–5.0%, | S ... 0.05–0.3% |
| Fe and unavoidable impurities ... Remainder | |

(the numerical values are in weight %)

<Reasons of addition of the respective components>

1. C(carbon) ... added for the purpose of obtaining a carbide structure. If the content is less than 0.8%, a carbide structure cannot be obtained, while if it exceeds 2.0%, the amount of carbides becomes too much, and so, machinability is degraded.

2. Si ..... added for the purpose of improving castability. If the content is less than 0.5%, castability is poor, while if it exceeds 2.0%, brittleness of the material results.

3. Mn ... added for the purpose of strengthening the matrix phase. When S is added to the material, MnS is produced resulting in improvement of machinability of the material. If the content is less than 0.3%, the matrix phase cannot be strengthened, while if it exceeds 1.5%, upon high-frequency quench hardening, residual austenite would increase, resulting in lowering of a hardness, and stability of sizes would be degraded.

4. Cr ... added for the purpose of forming carbides, stabilizing cementite, micro-fining pearlite, and thereby increasing hardness, wear resistance and heat resistance of, the material. If the content is less than 6.0%, carbides (chromium carbide) does not crystallize, while if it exceeds 15.0%, machinability is deteriorated, but up to the upper limit 20.0% the deterioration can be allowed by appropriately selecting tools.

5. Mo ... added for the purpose of strengthening the matrix phase and preventing temper softening after the high-frequency quench hardening. If the content is less than 0.3%, the effect of resisting against temper softening cannot be obtained, while even if it exceeds 5.0%, the effect does not become higher remarkably.

6% S ... added in the case where it is contemplated to improve machinability of the material. If the content is less than 0.05%, dispersion of sulfides cannot be realized, while if it exceeds 0.3%, the improvement effect for the machinability is little, and tenacity would be degraded.

Test Examples

1. A member (40 mmΦ×40 mm) formed of 18Cr cast steal was prepared as a test member A. An occupation area proportion of granular carbides on its slide surface was 40%. The matrix phase consisted of martensite structure.

2. A member formed by casting a material having a composition consisting of C ... 1.4%, Si ... 1.2%, Mn ... 0.7%, Cr ... 13%, Mo ... 0.7%, S ... 0.15% (every numerical value being in weight %) and Fe ... remainder (a carbide occupation area proportion of network-like carbides being 13%) and thereafter subjecting the cast piece to high-frequency quench hardening (HRC 55) to obtain martensite matrix phase, was subjected to surface treatment for the purpose of improving initial running-in property, and thereby a test member B (40 mmΦ×40 mm) was prepared. This surface treatment is a treatment for forming an $Fe_3O_4$ coating film on the surface of the member by holding the member subjected to the quench hardening treatment at a temperature of 500°-600° C. for 30-90 minutes within saturated steam. It is to be noted that as another surface treatment process, a $MoS_2$ baking treatment consisting of the step of [acid pickling]→[shot blast treatment]→[formation of a manganese phosphate coating film]→[$MoS_2$ spraying]→[baking (temperature 180° C.; time 60 min.)] is known, and this surface treatment could be applied.

3. A member formed of chilled cast iron (a carbide occupation area proportion being 60%) was subjected to a liquid carburizing and nitriding treatment, further it was subjected to the treatment for improving initial running-in property (see the preceding paragraph 2, and thereby a test piece C (40 mmΦ×40 mm) was prepared.

4. A member formed of chromium cast iron (a carbide occupation area, proportion being 20%) was subjected to a liquid carburizing and nitriding treatment, further it was subjected to the treatment for improving initial running-in property (see the preceding paragraph 2, and thereby a test piece D (40 mmΦ×40 mm) was prepared.

5. The test member A and the test member B, the test member A and the test member C, and the test member A and the test member D, respectively, were brought into contact with each other via their outer circumferential surfaces (surface pressure being 80 kg/mm²), then while lubricant oil is being dropped onto the slide surfaces, the test member A was rotated at 2000 rpm, while the test members B, C and D were rotated respectively at 2500 rpm, and after lapse of 150 hours, the surface conditions of the respective test members were investigated. The results are indicated in the following table.

| Combination | A-B | | A-C | | A-D | |
|---|---|---|---|---|---|---|
| Test members | A | B | A | C | A | D |
| Carbide area Proportion (%) | 40 | 13 | 40 | 60 | 40 | 20 |
| State of Carbide | granular | network | granular | granular | granular | granular |
| Abnormal wear due to Scuffing or pitting Yes or No | No | | Yes | | Yes | | cl <Evaluation of the Results>

The carbide occupation area proportion of network-like carbides in the test member B is 13%, while the carbide occupation area proportion in the test member A coming into slide contact with the test member B is 40%, but generation of abnormal wear is not present in either of them in spite of so high surface pressure as 80 Kg/mm². So it can be seen that the test member B having a metallurgical structure in which network-like carbides are dispersed in a martensite matrix phase, possesses excellent anti-wear property despite the fact that the carbide occupation area proportion therein is small.

As will be apparent from the above description, a combination of a first slide member made of ferrous material in which at least a slide surface layer thereof has a metallurgical structure having granular carbides dispersed in a matrix phase, and a second slide member made of ferrous material in which at least a slide surface layer thereof has a metallurgical structure having network-like carbides dispersed in a martensite matrix phase, has been proposed.

In this combination, abnormal wear of the respective slide members can be effectively suppressed by the combination of the granular carbides dispersing structure of the first slide member and the network-like carbides dispersing structure within the martensite matrix phase of the second slide member. Especially, by selecting the occupation area proportion of granular carbides on the slide surface of the first slide member larger than the occupation area proportion of network-like carbides in the second slide member, an excellent anti-wear property is obtainable from viewpoints of scuffing as well as pitting. Furthermore, by dispersing an appropriate amount of MnS along the network-like carbides in the second slide member, machinability of the second slide member can be improved.

What is claimed is:

1. A combination of a first slide member and a second slide member to be held in sliding contact with each other, said combination comprising a first slide member made of a ferrous material in which at least a slide surface layer thereof has a metallurgical structure having granular carbides dispersed in a matrix phase, and a second slide member formed of cast steel having a chemical composition comprising:

C 0.8-2.0%,
Si 0.4-2.0%,
Mn 0.3-1.5%,
Cr 6.0-20.0%,
Mo 0.3-5.0% by weight, the remainder being Fe and impurities and in which at least a slide surface layer thereof has a metallurgical structure comprising network-like carbides dispersed in a martensite matrix phase obtained by high frequency quench hardening after casting.

2. A combination of slide members as claimed in claim 1, characterized in that a proportion of an area occupied by the carbides in the slide surface of said first slide member is selected larger than a proportion of an area occupied by the carbides in the slide surface of said second slide member.

3. A combination of slide members as claimed in claim 1 or 2, characterized in that MnS is dispersed in said network-like carbides.

4. A combination of slide members as claimed in claim 3, characterized in that said second slide member is formed of cast steel having a composition comprising C ... 0.8-2.0%, Si ... 0.4-2.0%, Mn ... 0.3-1.5%, Cr ... 6.0-20.0%, Mo ... 0.3-5.0%, S ... 0.05-0.3% (every numerical value being in weight %), and remainder ... Fe and impurities.

* * * * *

UNITED STATES PATENT AND TRADEMARK OFFICE
CERTIFICATE OF CORRECTION

PATENT NO. : 4,927,707

DATED : May 22, 1990

INVENTOR(S) : MATSUBARA et al

It is certified that error appears in the above-identified patent and that said Letters Patent is hereby corrected as shown below:

On the cover page, Item [73], "Honda Giken Kogyo Kabashiki Kaisha" should read --Honda Giken Kogyo Kabushiki Kaisha--.

Signed and Sealed this

Seventeenth Day of December, 1991

Attest:

HARRY F. MANBECK, JR.

*Attesting Officer*  *Commissioner of Patents and Trademarks*